United States Patent
Tanzer et al.

(10) Patent No.: US 7,263,408 B1
(45) Date of Patent: Aug. 28, 2007

(54) METHOD AND SYSTEM FOR CONVERTING TOOL PROCESS ABILITY BASED UPON WORK IN PROGRESS CHARACTERISTICS

(75) Inventors: Troy Anthony Tanzer, Red Rock, TX (US); Elizabeth Weaver, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 0 days.

(21) Appl. No.: 10/979,381

(22) Filed: Nov. 2, 2004

(51) Int. Cl.
 *G06F 19/00* (2006.01)

(52) U.S. Cl. ............ 700/121; 700/105; 700/179; 438/14

(58) Field of Classification Search ............ 700/105, 700/108, 109, 110, 121, 173, 174, 175, 96, 700/99, 100, 117, 179; 438/14, 9, 15
See application file for complete search history.

(56) References Cited

U.S. PATENT DOCUMENTS

| | | | |
|---|---|---|---|
| 6,470,230 B1 * | 10/2002 | Toprac et al. ............ 700/121 |
| 6,594,589 B1 * | 7/2003 | Coss et al. ............ 702/34 |
| 6,650,958 B1 * | 11/2003 | Balazs et al. ............ 700/121 |
| 6,660,651 B1 * | 12/2003 | Markle ............ 438/9 |
| 6,842,658 B2 * | 1/2005 | Izawa et al. ............ 700/121 |
| 2002/0103563 A1 * | 8/2002 | Izawa et al. ............ 700/121 |
| 2003/0093177 A1 * | 5/2003 | Yasuda et al. ............ 700/214 |
| 2003/0220709 A1 * | 11/2003 | Hartman et al. ............ 700/121 |

* cited by examiner

*Primary Examiner*—Leo Picard
*Assistant Examiner*—Charles Kasenge
(74) *Attorney, Agent, or Firm*—Williams, Morgan & Amerson, P.C.

(57) ABSTRACT

The present invention is generally directed to methods and systems for converting tool processing ability based upon work in progress considerations. In one illustrative embodiment, the method includes identifying a plurality of wafers to be processed in one of a plurality of tools, identifying, on a collective basis, a number of different process operations to be performed in processing the wafers and a number of wafers to be processed in accordance with each of the different process operations, changing a processing ability of at least one of the tools based upon the number of wafers to be processed in accordance with the different process operations, and processing at least one of the wafers in at least one of the tools wherein the processing ability was changed. In other embodiments, the method comprises changing the processing ability of at least one of the tools such that the processing ability of the tools, considered collectively, is correlated with the number of wafers to be processed in accordance with each of the different process operations.

21 Claims, 4 Drawing Sheets

| | WAFER LOT NUMBER | | | | | | | | | | | | | | | | | | | | TOTALS |
|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | |
| | A | | | | | A | A | | | | | A | | | | | | A | | | 5 |
| | | B | | B | B | | | B | B | B | B | | B | B | B | B | B | | B | B | 13 |
| | | | C | | | | | C | | | | | | | | | | | | | 2 |

| TOOL | INITIAL TOOL ABILITY CONFIGURATION |
|---|---|
| 1 | A |
| 2 | B |
| 3 | C |
| 4 | A |

Figure 4A

| TOOL | CHANGED TOOL ABILITY CONFIGURATION |
|---|---|
| 1 | B |
| 2 | B |
| 3 | C |
| 4 | A |

Figure 4B

| TOOL | CHANGED TOOL ABILITY CONFIGURATION |
|---|---|
| 1 | B |
| 2 | B |
| 3 | B |
| 4 | A |

METHOD AND SYSTEM FOR CONVERTING TOOL PROCESS ABILITY BASED UPON WORK IN PROGRESS CHARACTERISTICS

BACKGROUND OF THE INVENTION

1. Field of the Invention

This invention relates generally to an industrial process, and, more particularly, to various methods and systems for converting tool processing ability based upon work in progress characteristics.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Generally, a set of processing steps is performed on a lot of wafers using a variety of process tools, including photolithography steppers, etch tools, deposition tools, polishing tools, thermal anneal process tools, ion implantation tools, etc. The technologies underlying semiconductor process tools have attracted increased attention over the last several years, resulting in substantial refinements. However, despite the advances made in this area, many of the process tools that are currently commercially available suffer certain deficiencies. In particular, some of such tools often lack advanced process data monitoring capabilities, such as the ability to provide historical parametric data in a user-friendly format, as well as event logging, real-time graphical display of both current processing parameters and the processing parameters of the entire run, and remote, i.e., local site and worldwide, monitoring. These deficiencies can engender non-optimal control of critical processing parameters, such as throughput, accuracy, stability and repeatability, processing temperatures, mechanical tool parameters, and the like. This variability manifests itself as within-run disparities, run-to-run disparities and tool-to-tool disparities that can propagate into deviations in product quality and performance, whereas an ideal monitoring and diagnostics system for such tools would provide a means of monitoring this variability, as well as providing means for optimizing control of critical parameters.

One technique for improving the operation of a semiconductor processing line includes using a factory wide control system to automatically control the operation of the various process tools. The manufacturing tools communicate with a manufacturing frame-work or a network of processing modules. Each manufacturing tool is generally connected to an equipment interface. The equipment interface is connected to a machine interface that facilitates communications between the manufacturing tool and the manufacturing frame-work. The machine interface can generally be part of an advanced process control (APC) system. The APC system initiates a control script based upon a manufacturing model, which can be a software program that automatically retrieves the data needed to execute a manufacturing process. Often, semiconductor devices are staged through multiple manufacturing tools for multiple processes, generating data relating to the quality of the processed semiconductor devices.

In addition to the constant drive to reduce the size of integrated circuit devices, there is also a constant drive to improve manufacturing efficiencies and increase production yields. Even minor improvements in production yields can greatly improve the profitability of semiconductor manufacturing operations. To that end, semiconductor manufacturers are constantly in search of novel techniques that improve the manufacturing capability and efficiency of semiconductor manufacturing facilities. Nevertheless, some semiconductor manufacturing facilities still process wafer lots through the manufacturing facility in inefficient manners. For example, in some cases, at least some process tools are configured to perform a very specific type of process operation, e.g., an ion implant tool configured to implant arsenic atoms into a semiconducting substrate. The processing ability of this tool may remain unchanged over an extended period of time or, in some cases, throughout its useful life, irrespective of the work to be performed within the manufacturing facility. Unfortunately, such practices create an environment in which manufacturing efficiencies and productivity may suffer.

The present invention is directed to overcoming, or at least reducing the effects of, one or more of the problems set forth above.

SUMMARY OF THE INVENTION

The present invention is generally directed to various methods and systems for converting tool processing ability based upon work in progress characteristics. In one illustrative embodiment, the method comprises identifying a plurality of wafers to be processed in one of a plurality of tools, identifying, on a collective basis, a number of different process operations to be performed in processing the plurality of wafers and a number of wafers to be processed in accordance with each of the different process operations, changing a processing ability of at least one of the plurality of tools based upon the number of wafers to be processed in accordance with the different process operations, and processing at least one of the plurality of wafers in at least one of the plurality of tools wherein the processing ability was changed. In other embodiments, the method comprises changing the processing ability of at least one of the tools such that the processing ability of the plurality of tools, considered collectively, is correlated with the number of wafers to be processed in accordance with each of the different process operations. In even further embodiments, additional wafers or wafer lots may be processed through at least one of the plurality of tools.

In another illustrative embodiment, the method comprises identifying a plurality of wafer lots to be processed in one of a plurality of tools, identifying, on a collective basis, a number of different process operations to be performed in processing the plurality of wafer lots and a number of wafer lots to be processed in accordance with each of the different process operations, changing a processing ability of at least one of the plurality of tools based upon the number of wafer lots to be processed in accordance with the different process operations, and processing at least one of the plurality of wafer lots in at least one of the plurality of tools wherein the processing ability was changed.

In yet another illustrative embodiment, the method comprises identifying a plurality of wafer lots to be processed in one of a plurality of tools, identifying, on a collective basis, a number of different process operations to be performed in processing the plurality of wafer lots and a number of wafer lots to be processed in accordance with each of the different process operations, changing the processing ability of at least one of the tools such that the processing ability of the plurality of tools, considered collectively, is correlated with the number of wafer lots to be processed in accordance with each of the different process operations, and processing at least one of the plurality of wafer lots in at least one of the plurality of tools wherein the processing ability was changed.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached figures. Various structures, systems, devices and tools may be schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
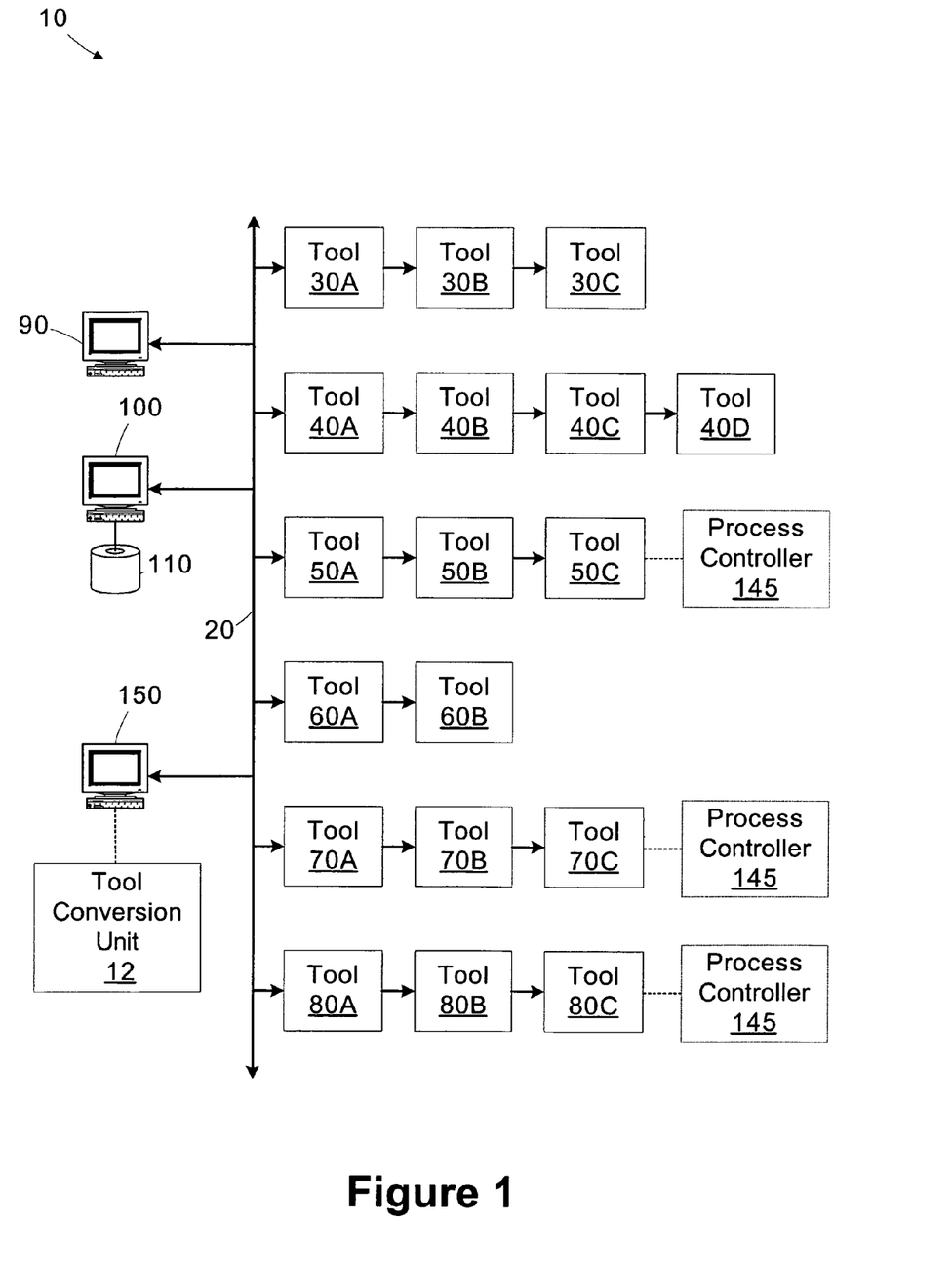
FIG. 1 is a simplified block diagram of a manufacturing system in accordance with one illustrative embodiment of the present invention.

Referring to FIG. 1, a simplified block diagram of an illustrative manufacturing system 10 is provided. In the illustrated embodiment, the manufacturing system 10 is adapted to fabricate semiconductor devices. Although the invention is described as it may be implemented in a semiconductor fabrication facility, the invention is not so limited and may be applied to other manufacturing environments. The techniques described herein may be applied to a variety of workpieces or manufactured items, including, but not limited to, microprocessors, memory devices, digital signal processors, application specific integrated circuits (ASICs), or other devices. The techniques may also be applied to workpieces or manufactured items other than semiconductor devices.

A network 20 interconnects various components of the manufacturing system 10, allowing them to exchange information. The illustrative manufacturing system 10 includes a plurality of tools 30-80. Each of the tools 30-80 may be coupled to a computer (not shown) for interfacing with the network 20. The tools 30-80 may be grouped into sets of like tools, as denoted by lettered suffixes. For example, the set of tools 30A-30C represent tools of a certain type, such as an ion implant tool, a deposition tool, an etch tool, a chemical mechanical planarization tool. A particular wafer or lot of wafers progresses through the tools 30-80 as it is being manufactured, with each tool 30-80 performing a specific function in the process flow. Exemplary processing tools for a semiconductor device fabrication environment include metrology tools, photolithography steppers, etch tools, deposition tools, polishing tools, rapid thermal anneal tools, implantation tools, etc. The tools 30-80 are illustrated in a rank and file grouping for illustrative purposes only. In an actual implementation, the tools 30-80 may be arranged in any physical order or grouping. Additionally, the connections between the tools in a particular grouping are meant to represent connections to the network 20, rather than interconnections between the tools 30-80.

A manufacturing execution system (MES) server or controller 90 may direct high level operation of the manufacturing system 10. The MES server 90 may monitor the status of the various entities in the manufacturing system 10 (i.e., lots, tools 30-80) and control the flow of articles of manufacture (e.g., lots of semiconductor wafers) through the process flow. A database server 100 is provided for storing data related to the status of the various entities and articles of manufacture in the process flow. The database server 100 may store information in one or more data stores 110. The data may include pre-process and post-process metrology data, tool states, lot priorities, operating recipes, etc. The controller 90 may also provide operating recipes to one or more of the tools depicted in FIG. 1. Of course, the controller 90 need not perform all of these functions. Moreover, the functions described for the controller 90 may be performed by one or more computers spread throughout the system 10.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

The manufacturing system 10 also includes a tool conversion unit 12 executing on an illustrative workstation 150. As described more fully below, the tool conversion unit 12 may be employed in converting the processing ability of one or more of the tools within the manufacturing system 10. The tool conversion unit 12 described herein may be used with respect to converting the processing ability of any type of tool that is used to perform any type of operation. For example, the tool conversion unit 12 may be used as described herein with any of a variety of different metrology tools and any of a variety of different process tools, e.g., etch tools, deposition tools, CMP tools, film thickness measurement tools, etc. Thus, the present invention should not be considered as limited in use to any particular type of tool unless such limitations are expressly set forth in the appended claims.

The tool conversion unit 12 may communicate with the controller 90 and/or with one or more process controllers 145 associated with the individual tools 30-80 for purposes to be described later herein. The particular control models used by the process controllers 145 depend on the type of tool 30-80 being controlled. The control models may be developed empirically using commonly known linear or non-linear techniques. The control models may be relatively simple equation-based models (e.g., linear, exponential, weighted average, etc.) or a more complex model, such as a neural network model, principal component analysis (PCA) model, partial least squares projection to latent structures (PLS) model. The specific implementation of the control models may vary depending on the modeling techniques selected and the process being controlled. The selection and development of the particular control models would be within the ability of one of ordinary skill in the art, and accordingly, the control models are not described in greater detail herein for clarity and to avoid obscuring the instant invention.

An exemplary information exchange and process control framework suitable for use in the manufacturing system 10 is an Advanced Process Control (APC) framework, such as may be implemented using the Catalyst system formerly offered by KLA-Tencor, Inc. The Catalyst system uses Semiconductor Equipment and Materials International (SEMI) Computer Integrated Manufacturing (CIM) Framework compliant system technologies and is based the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI, which is headquartered in Mountain View, Calif.

The processing and data storage functions are distributed amongst the different computers or workstations in FIG. 1 to provide general independence and central information storage. Of course, different numbers of computers and different arrangements may be used without departing from the spirit and scope of the instant invention.

Figure 2:
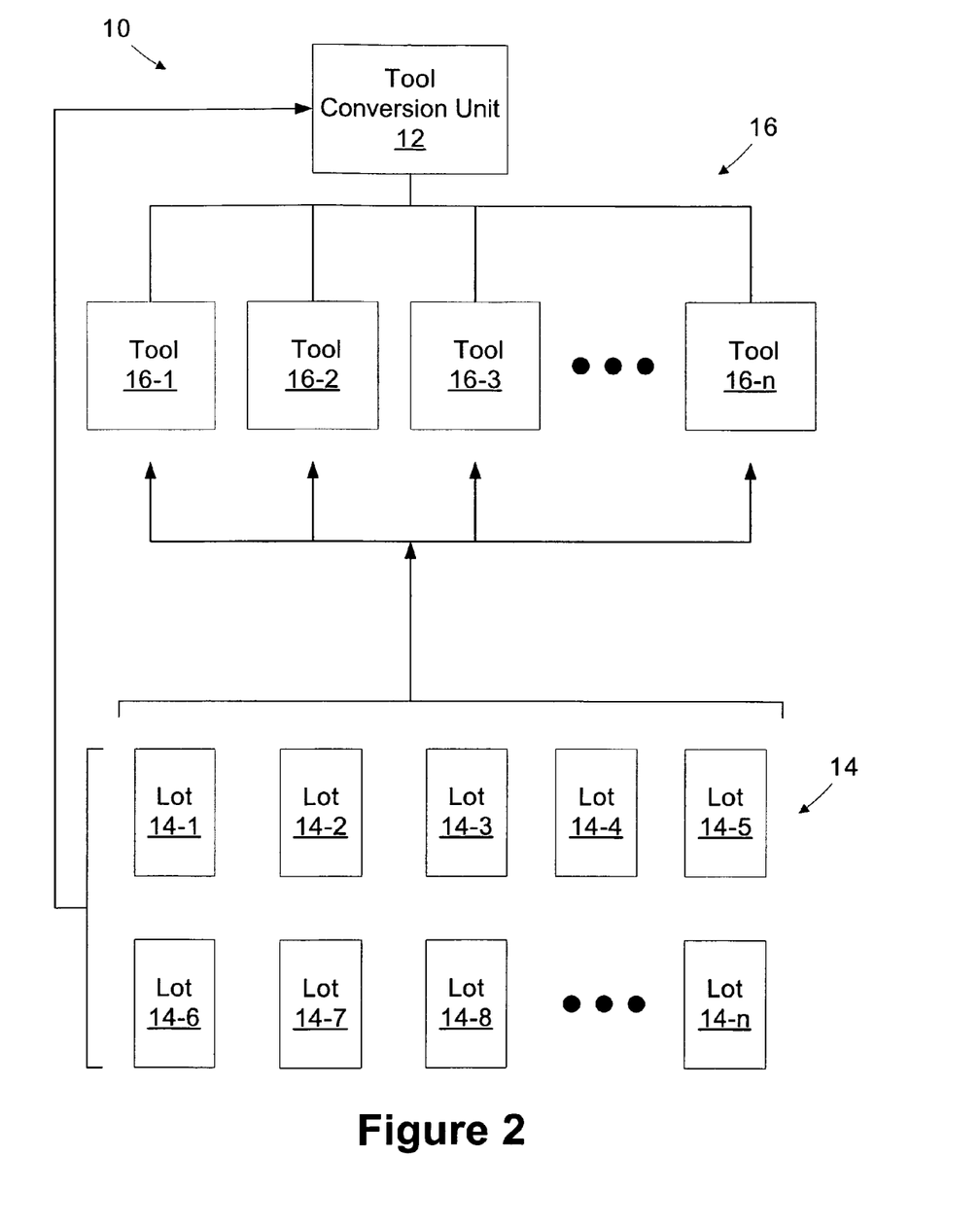
FIG. 2 is a simplified block diagram of a more detailed depiction of a system in accordance with one illustrative embodiment of the present invention.

FIG. 2 is a more specific, simplified block diagram of a portion of a manufacturing system 10 in accordance with one illustrative embodiment of the present invention. As shown therein, a plurality of wafer lots 14, i.e., lots **14-1-14-*n*, are to be processed in one of the plurality of illustrative tools 16, i.e., 16-1-16-*n*. In general, as described more fully herein, the tool conversion unit 12 may be employed in connection with changing the processing ability of one or more of the tools 16 based upon the number of different process operations to be performed on the group of wafer lots 14, considered collectively, and the number of lots associated with each of the different process operations. As set forth previously, the tools 16 are intended to be representative in nature as it may be representative of any type of tool capable of performing any type of processing operation or metrology operation within a semiconductor manufacturing facility, e.g., ion implant tools, deposition tools, etching tools, chemical mechanical polishing tools, metrology tools, etc. Thus, the present invention should not be considered as limited to any particular type of tool nor to the type of operation such tool performs. Of course, any number of wafer lots 14 may be processed in the tools 16, and the processing of such wafer lots 14 may occur at regular or irregular time intervals. Moreover, the present invention may also be employed in situations where a plurality of individual wafers (not shown), as opposed to the plurality of wafer lots 14, are to be processed in the plurality of tools 16**.

In performing the various functions described herein, the tool conversion unit 12 may communicate with one or more of the controllers or computers depicted in FIG. 1. According to one aspect of the present invention, the tool conversion unit 12 may be employed in connection with changing the processing ability of one or more of the tools 16 based upon the characteristics and processing requirements for the collection of wafer lots 14 to be processed in the tools 16, i.e., based upon the characteristics of the work-in-progress (WIP) for the tools 16. In one illustrative embodiment, the characteristics of the collection of wafer lots 14 refers to the variety of different processing operations to be performed on the wafer lots 14 and the number of such wafer lots 14 associated with each of the different process operations.

In one particularly illustrative example, the tools 16 may be three illustrative ion implantation tools, i.e., 16-1, 16-2, 16-3, and the plurality of wafer lots 14-1-14-*n* are to have various ion implant processes performed on them in one of the ion implant tools 16. For example, some of the wafer lots 14 are scheduled to have arsenic ions implanted therein, other of the wafer lots 14 may be scheduled to have boron ions implanted therein, while yet another group of the plurality of wafer lots 14 may be scheduled to have phosphorous ions implanted therein. In accordance with traditional manufacturing operations, each of the ion implant tools may be configured to perform one of the ion implant processes, i.e., tool 16-1 may be adapted to perform the arsenic implant process, tool 16-2 adapted to perform the boron implant process, and tool 16-3 adapted to perform the phosphorous implant process. Thereafter, using traditional manufacturing techniques, when the appropriate ion implant tool 16 is available, the appropriate wafer lots 14 would be directed to the appropriate ion implant tool 16 to have the desired implant process operation performed thereon. However, this methodology may, in some cases, result in the inefficient use of processing resources to perform the various process operations on the collection of wafer lots 14. That is, using this prior art methodology, the processing of the wafer lots 14 may be delayed depending on the availability of an ion implant tool 16 that has its processing ability configured so that it can perform the desired process operation.

In accordance with one aspect of the present invention, the processing ability of one or more of the tools 16 may be changed based upon the characteristics associated with the plurality of wafer lots 14 to be processed in the tools 16. To that end, an initial step involves identifying, on a collective basis, the number of different process operations to be performed in processing the plurality of wafer lots 14 in the tools 16, and identifying the number of wafer lots to be processed in accordance with each of the different process operations. In the illustrative example described above, this step would involve identifying all of the various types of ion implant processes to be performed, i.e., arsenic, boron and phosphorous, and the number of wafer lots 14 that are to have each different type of process operation performed thereon. It should be understood that, in determining the number of different process operations performed on the collective group of wafer lots 14, the definition of the different process operation may involve mere changes in one or more parameters of the process operation performed in the various tools. In the illustrative example described above, the different process operations for an illustrative group of ion implant tools 16 was defined based upon the type of ions to be implanted into the wafers within each of the various wafer lots 14. However, in other cases, it may be defined as a different process recipe to be performed on the various wafer lots 14. In short, in one aspect of the present invention, the processing ability of at least one of the tools 16 is changed such that the processing ability of the tools 16, considered collectively, is correlated with the number of wafers or wafer lots to be processed in accordance with each of the different process operations.

After the characteristics associated with the group of wafer lots 14 is identified, the next step involves changing a processing ability of one or more of the tools 16 based upon the number of wafer lots (or wafers) to be processed in accordance with the different process operations. In some cases, the step of changing the processing ability of one or more of the tools 16 may involve physically reconfiguring portions or aspects of the tools, e.g., changing the target material in an illustrative ion implant tool. In other cases, the act of changing the processing ability of one or more of the tools 16 may involve changing gas flow rates, voltage levels, parameter settings, etc. In some cases, the act of changing the processing ability of one or more of the tools 16 may involve the use of plant personnel to physically change the configuration of the tools, or it may be accomplished by the tool conversion unit 12, or other computers within the manufacturing facility 10 by controlling the operation of one or more valves, power sources or parameter settings.

Figure 3:
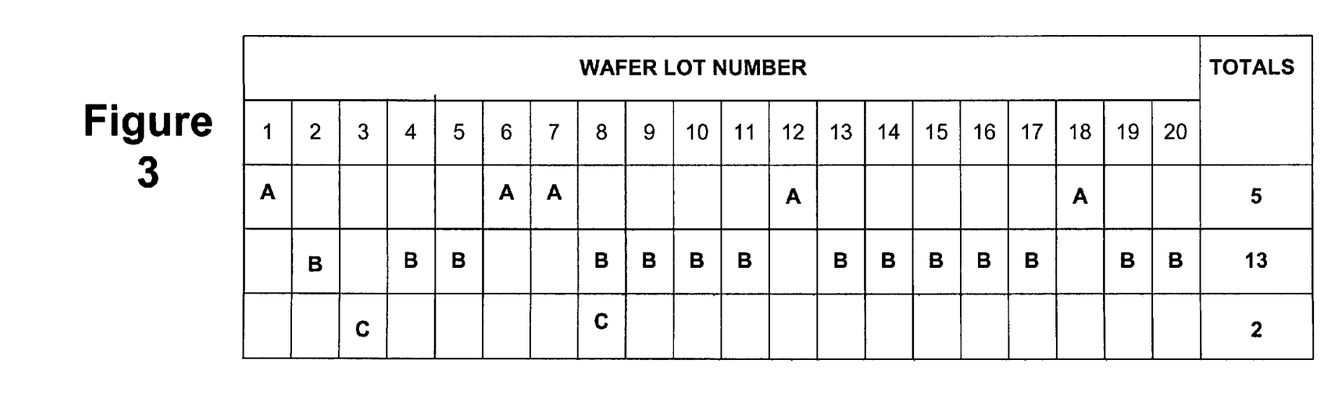
FIG. 3 is a graphical example depicting how the present invention may be employed in connection with determining the processing backlog of a plurality of wafer lots to be processed in a plurality of tools.
Figure 4A:
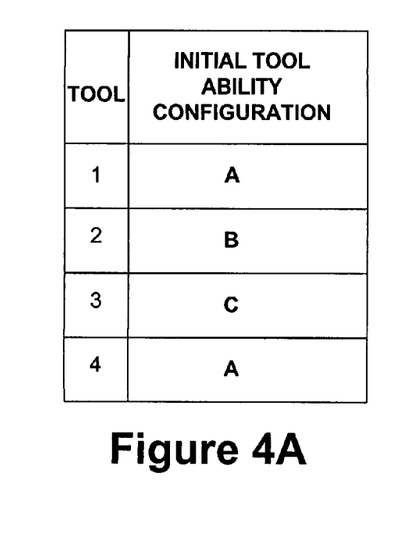
FIGS. 4A-4C depict illustrative examples wherein the processing ability of at least one of the tools has been changed from an initial ability configuration in accordance with one aspect of the present invention.
Figure 4B:
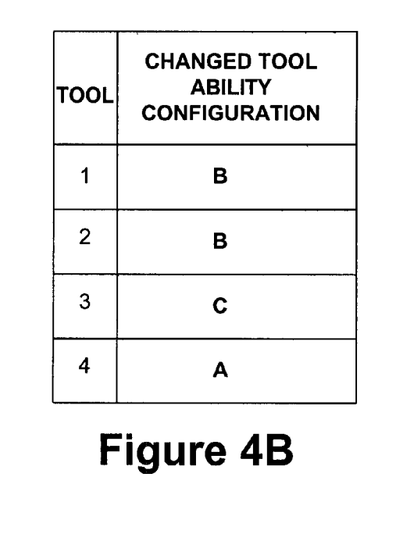
Figure 4C:
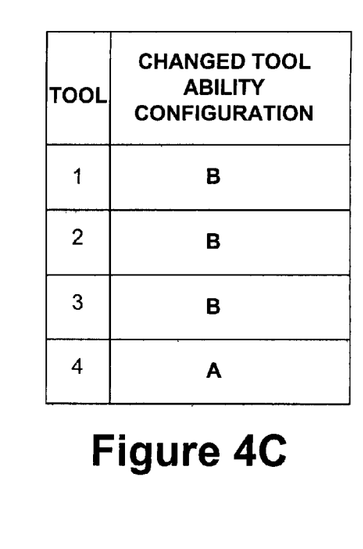

FIGS. 3 and 4A-4C will now be used to describe other illustrative examples of the present invention. FIG. 3 is a graph depicting a particular processing operation, i.e., A, B or C, to be performed on each of a plurality of wafer lots 1-20. The twenty illustrative wafer lots will be processed in four illustrative processing tools 1-4. FIG. 4A depicts the original tool processing ability setup for the various tools 1-4 as it relates to the performance of the process operations A-C, whereas FIGS. 4B and 4C depict instances in which the processing ability of one or more of the tools 1-4 is changed based upon the characteristics associated with the plurality of wafer lots 14. As shown in FIG. 3, of the twenty wafer lots to be processed in the tools 16, thirteen of the wafer lots 14 are scheduled to have operation B performed thereon, five of the wafer lots 14 are scheduled to have operation A performed thereon, and two of the wafer lots 14 are scheduled to have operation C performed thereon. In accordance with the original setup of the tools 16, as indicated in FIG. 4A, tools 1 and 4 are set up to perform operation A, whereas tool 2 is set up to perform operation B, and tool 3 is set up to perform operation C. Based upon the characteristics associated with the twenty wafer lots 14, a large number of the wafer lots 14 require the process operation B be performed thereon relative to the other two types of processing operations, A and C. If the processing abilities of the tools 16 were maintained as indicated in FIG. 4A, processing of the wafer lots 14 through the various tools 16 would take longer as only one tool (tool 2) is set up to run processing operation B, which has the most number of occurrences within the group of twenty wafer lots 14.

In accordance with one aspect of the present invention, the processing ability of one or more of the tools 16 may be changed based upon the number of wafers lots 14 associated with different process operations to be performed on the collection of wafer lots 14. For example, as indicated in FIG. 4B, in one illustrative embodiment, the processing ability of tool 1 may be changed such that tool 1 is now adapted to perform the process operation B. Using the new tool configuration for the four tools 1-4 depicted in FIG. 4B, more processing resources, i.e., tools 1 and 2, are adapted to perform the process operation B that is in greater demand relative to operations A and C. In this particular embodiment, the tools 1-4 are configured such that each of the process operations A-C may still be performed in at least one of the tools in the collective group of tools 1-4. Once the processing ability of tool 1 has been changed as described herein, the collection of wafer lots 14 may be processed through the tools 1-4 in a more expeditious manner, thereby leading to improved manufacturing efficiencies. Additional wafers or wafer lots may also be later processed through the tools 16.

FIG. 4C depicts yet another illustrative situation in which the processing ability of one or more of the tools 16 may be changed based upon the characteristics associated with the wafer lots 14. As shown therein, relative to the original tool ability setup shown in FIG. 4A, the processing ability of tools 1 and 3 have been changed such that the tools may now perform the most demanded process operation B. In this particular embodiment, none of the tools 1-4 are configured to perform the process operation C. However, given that there is relatively minor demand for the processing operation C, i.e., two lots, and the relatively high demand for the processing operation B, i.e., thirteen lots, it may be appropriate to temporarily delay the processing of the wafer lots 14 needing the processing operation C performed thereon until such time as the backlog of wafer lots 14 needing the processing operation B performed thereon has been significantly reduced. Of course, at a later date, the decision may be made to convert one or more of the tools 1-4 such that it may again perform the process operation C. As will be recognized by those skilled in the art after a complete reading of the present application, the methodologies described herein may be employed on a continuous, intermittent or as-needed basis as the wafer lots 14 are provided to the tools 16 to have processing operations performed thereon.

As indicated above, the tools 16 may perform any type of process operation. In the specific example discussed above, the tools 16 were a plurality of ion implant tools adapted to perform different process operations wherein different ions are to be implanted in the wafers within the wafer lots 14. However, the present invention may also be employed in connection with other process operations. For example, the tools 16 may be a collection of deposition tools, each of which are adapted to form a particular type of layer of material. For example, one such deposition tool may be adapted to perform a chemical vapor deposition process to form a layer of silicon dioxide, another deposition tool may be a plasma enhanced chemical vapor deposition tool adapted to form a layer of silicon dioxide, and yet another deposition tool may be a chemical vapor deposition tool adapted to form a layer of silicon nitride. In accordance with one aspect of the present invention, the processing ability of one or more of the deposition tools may be changed based upon the characteristics associated with the twenty wafer lots 14 to be processed therein. That is, in some cases, changing the processing ability may involve changing gas flow rates, enabling or disabling plasma generating capabilities, controlling the temperature of the deposition process and/or gases employed therein.

As yet another illustrative example, the present invention may be employed where the plurality of wafer lots 14 are provided to a plurality of etch tools 16 to have a plurality of different etching operations performed thereon. In a specific example, one of the etching tools may be adapted to perform an etching process on a layer of insulating material, e.g., silicon dioxide, another of the etching tools may be configured to perform an etching process on the wafers to form trenches therein, and yet another of the etching tools may be adapted to perform an etching process on a layer of metal. Depending upon the characteristics associated with the twenty wafer lots 14, the processing ability of one or more of the etching tools may be changed.

Figure 5:
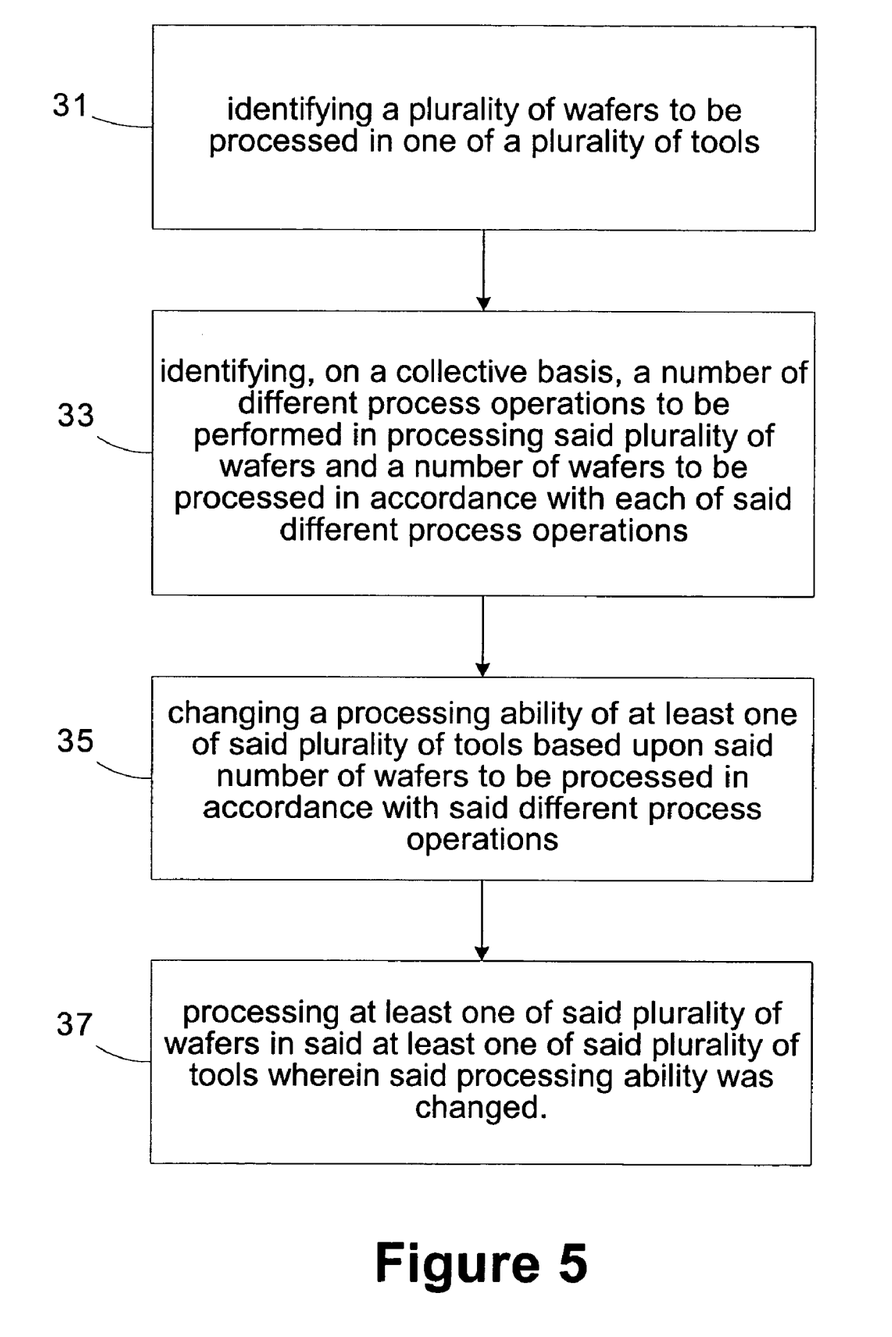
FIG. 5 is a simplified flow diagram of a method in accordance with one illustrative embodiment of the present invention.

The present invention is generally directed to various methods and systems for converting tool processing ability based upon the characteristics associated with a plurality of wafer lots to be processed in the tools 16. In one illustrative embodiment, as depicted in flowchart form in FIG. 5, the method comprises identifying a plurality of wafers to be processed in one of a plurality of tools, as indicated in block 31, and identifying, on a collective basis, a number of different process operations to be performed in processing the plurality of wafers and a number of wafers to be processed in accordance with each of the different process operations, as set forth in block 33. The method further comprises changing a processing ability of at least one of the plurality of tools based upon the number of wafers to be processed in accordance with the different process operations, as recited in block 36, and processing at least one of the plurality of wafers in at least one of the plurality of tools wherein the processing ability was changed, as indicated in block 37. In even further embodiments, the method comprises changing the processing ability of at least one of the tools such that the processing ability of the plurality of tools, considered collectively, is correlated with the number of wafers to be processed in accordance with each of the different process operations. In other embodiments, the method further comprises processing additional wafers through at least one of the plurality of tools.

In another illustrative embodiment, the method comprises identifying a plurality of wafer lots to be processed in one of a plurality of tools, identifying, on a collective basis, a number of different process operations to be performed in processing the plurality of wafer lots and a number of wafer lots to be processed in accordance with each of the different process operations, changing a processing ability of at least one of the plurality of tools based upon the number of wafer lots to be processed in accordance with the different process operations, and processing at least one of the plurality of wafer lots in at least one of the plurality of tools wherein the processing ability was changed.

In yet another illustrative embodiment, the method comprises identifying a plurality of wafer lots to be processed in one of a plurality of tools, identifying, on a collective basis, a number of different process operations to be performed in processing the plurality of wafer lots and a number of wafer lots to be processed in accordance with each of the different process operations, changing the processing ability of at least one of the tools such that the processing ability of the plurality of tools, considered collectively, is correlated with the number of wafer lots to be processed in accordance with each of the different process operations, and processing at least one of the plurality of wafer lots in at least one of the plurality of tools wherein the processing ability was changed.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:

identifying a plurality of wafers to be processed in one of a plurality of tools;

identifying, on a collective basis, a number of different process operations to be performed in processing said plurality of wafers and a number of wafers remaining to be processed in accordance with each of said different process operations;

changing a processing ability of at least one of said plurality of tools to configure the tool to perform a different one of the process operations based upon said number of wafers lots remaining to be processed in accordance with said different process operations; and processing at least one of said plurality of wafers in said at least one of said plurality of tools wherein said processing ability was changed.

2. The method of claim 1, further comprising processing additional wafers through at least one of said plurality of tools.

3. The method of claim 1, wherein said plurality of wafers comprises a plurality of wafer lots.

4. The method of claim 1, wherein said plurality of tools are adapted to perform one of an ion implantation process, a deposition process, an etching process, a chemical mechanical polishing process and a metrology process.

5. The method of claim 1, wherein said plurality of tools are ion implant tools and said step of changing the processing ability of one of said tools comprises changing the processing ability of at least one of said ion implant tools to enable such tool to be used to implant a particular type of material.

6. The method of claim 1, wherein said plurality of tools are deposition tools and said step of changing the processing ability of one of said tools comprises changing the processing ability of at least one of said deposition tools to enable such tool to be used to deposit a particular type of material.

7. The method of claim 1, wherein said plurality of tools are deposition tools and said step of changing the processing ability of one of said tools comprises changing at least one parameter of a deposition process to be performed by at least one of said deposition tools.

8. The method of claim 1, wherein said plurality of tools are etch tools and said step of changing the processing ability of one of said tools comprises changing the processing ability of at least one of said etch tools to enable such tool to be used to etch a particular type of material.

9. The method of claim 1, wherein said plurality of tools are etch tools and said step of changing the processing ability of one of said tools comprises changing at least one parameter of an etching process to be performed by at least one of said etch tools.

10. The method of claim 1, wherein changing the processing ability of at least one of said tools comprises changing the processing ability of at least one of said tools such that the processing ability of said plurality of tools, considered collectively, is correlated with the number of wafers to be processed in accordance with each of said different process operations.

11. A method, comprising:
    identifying a plurality of wafer lots to be processed in one of a plurality of tools;
    identifying, on a collective basis, a number of different process operations to be performed in processing said plurality of wafer lots and a number of wafers lots remaining to be processed in accordance with each of said different process operations;
    changing a processing ability of at least one of said plurality of tools to configure the tool to perform a different one of the process operations based upon said number of wafers lots remaining to be processed in accordance with said different process operations; and
    processing at least one of said plurality of wafer lots in said at least one of said plurality of tools wherein said processing ability was changed.

12. The method of claim 11, further comprising processing additional wafer lots through at least one of said plurality of tools.

13. The method of claim 11, wherein said plurality of tools are adapted to perform one of an ion implantation process, a deposition process, an etching process, a chemical mechanical polishing process and a metrology process.

14. The method of claim 11, wherein said plurality of tools are ion implant tools and said step of changing the processing ability of one of said tools comprises changing the processing ability of at least one of said ion implant tools to enable such tool to be used to implant a particular type of material.

15. The method of claim 11, wherein said plurality of tools are deposition tools and said step of changing the processing ability of one of said tools comprises changing the processing ability of at least one of said deposition tools to enable such tool to be used to deposit a particular type of material.

16. The method of claim 11, wherein said plurality of tools are deposition tools and said step of changing the processing ability of one of said tools comprises changing at least one parameter of a deposition process to be performed by at least one of said deposition tools.

17. The method of claim 11, wherein said plurality of tools are etch tools and said step of changing the processing ability of one of said tools comprises changing the processing ability of at least one of said etch tools to enable such tool to be used to etch a particular type of material.

18. The method of claim 11, wherein said plurality of tools are etch tools and said step of changing the processing ability of one of said tools comprises changing at least one parameter of an etching process to be performed by at least one of said etch tools.

19. The method of claim 11, wherein changing the processing ability of at least one of said tools comprises changing the processing ability of at least one of said tool such that the processing ability of said plurality of tools, considered collectively, is correlated with the number of wafer lots to be processed in accordance with each of said different process operations.

20. A method, comprising:
    identifying a plurality of wafer lots to be processed in one of a plurality of tools;
    identifying, on a collective basis, a number of different process operations to be performed in processing said plurality of wafer lots and a number of wafers lots remaining to be processed in accordance with each of said different process operations;
    changing the processing ability of at least one of said tools to configure the tool to perform a different one of the process operations such that the processing ability of said plurality of tools, considered collectively, is correlated with the number of wafers lots remaining to be processed in accordance with each of said different process operations; and
    processing at least one of said plurality of wafer lots in said at least one of said plurality of tools wherein said processing ability was changed.

21. The method of claim 20, further comprising processing additional wafer lots through at least one of said plurality of tools.

* * * * *